(12) United States Patent
Drozt et al.

(10) Patent No.: US 8,473,549 B2
(45) Date of Patent: Jun. 25, 2013

(54) METHOD OF IDENTIFYING AND CONVEYING A ROLE ASSOCIATED WITH USERS IN A COMMUNICATION

(75) Inventors: Peter M. Drozt, Prairie Grove, IL (US); Laura A. Christensen, Arlington Heights, IL (US); Matthew C. Keller, Algonquin, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 182 days.

(21) Appl. No.: 12/341,492

(22) Filed: Dec. 22, 2008

(65) Prior Publication Data

US 2010/0161728 A1 Jun. 24, 2010

(51) Int. Cl.
*G06F 15/16* (2006.01)
(52) U.S. Cl.
USPC ............................. 709/204; 726/3; 455/456.6
(58) Field of Classification Search
USPC ........................................................ 709/204
See application file for complete search history.

(56) References Cited

U.S. PATENT DOCUMENTS

| 6,360,022 | B1 * | 3/2002 | Lubin et al. ................... 382/260 |
| 6,879,584 | B2 * | 4/2005 | Thro et al. .................... 370/352 |
| 6,963,879 | B2 * | 11/2005 | Colver et al. ......................... 1/1 |
| 7,406,535 | B2 | 7/2008 | Saulpaugh et al. |
| 2002/0103870 | A1 | 8/2002 | Shouji |
| 2002/0124053 | A1 | 9/2002 | Adams |
| 2004/0248597 | A1 | 12/2004 | Mathis |
| 2005/0070312 | A1 * | 3/2005 | Seligmann et al. ........ 455/456.6 |
| 2005/0259802 | A1 | 11/2005 | Gray |
| 2006/0080613 | A1 | 4/2006 | Savant |
| 2006/0117378 | A1 * | 6/2006 | Tam et al. .......................... 726/3 |
| 2006/0218624 | A1 | 9/2006 | Ravikumar et al. |
| 2006/0253456 | A1 | 11/2006 | Pacholec |
| 2009/0276461 | A1 | 11/2009 | Kuehner |
| 2010/0005518 | A1 | 1/2010 | Tirpak |

FOREIGN PATENT DOCUMENTS

WO 2006119086 A2 11/2006

OTHER PUBLICATIONS

PCT International Search Report Dated Jul. 19, 2010.

(Continued)

*Primary Examiner* — Yves Dalencourt
(74) *Attorney, Agent, or Firm* — Steven A. May

(57) ABSTRACT

A method for identifying and conveying a role of a first user relative to a second user in a communication comprises using a communication server to determine an identity of the first user, determine an identity of the second user, determine a relationship between the first user and the second user, determine an associated role with the first user relative to the relationship between the first user and the second user, and convey the associated role of the first user relative to the relationship to the second user. The communication server receives an indication that a communication between the users is initiated. The communication server and/or a source are configured for tracking one or more of the identities, relationships, and roles of the first and second users. Each user may have a plurality of roles and the identity and roles may by fixed or dynamically assigned.

20 Claims, 3 Drawing Sheets

OTHER PUBLICATIONS

Jordan, Ken et al.: The Augmented Social Network: Building identity and trust into the next-generation Internet, http://www.uic.edu/htbin/cgiwrap/bin/ojs/index.php/fm/, First Monday, vol. 8, No. 8-4 Aug. 2003, pp. 1-74.

Buford, John et al.: Social Certificates and Trust Negotiation, IEEE CCNC 2006 IEEE, pp. 615-619.

International Preliminary Report on Patentability and Written Opinion for counterpart International Patent Application No. PCT/US2009/068348 issued on Jun. 29, 2011.

Extended European Search Report for counterpart International Patent Application No. PCT/US2009/068348 issued on Feb. 11, 2013.

English language translation of Office Action issued on Jan. 24, 2013 in related counterpart Korean Patent Application No. 10-2011-7017132.

* cited by examiner

METHOD OF IDENTIFYING AND CONVEYING A ROLE ASSOCIATED WITH USERS IN A COMMUNICATION

TECHNICAL FIELD

This technical field relates generally to communication systems, and in particular, it relates to a method of identifying and conveying one or more roles of a user in a communication relative to another user in the communication.

BACKGROUND

Today, people frequently communicate electronically with family, acquaintances, coworkers, and strangers through wireless communication networks. One problem associated with wired or wireless communication, however, is that a person may not always be familiar with the people on the other end of the communication, so the recipient may not always know who is talking or sending something to him or her. Often it is not just the person's name that is necessary, but his relationship to the recipients and the role that the other person is associated with in the context of that relationship.

For example, a person might receive a telephone call and the caller identification function of the telephone may indicate the name of the person calling, for example, Jane Smith; however, the recipient of the telephone call might not know Jane Smith or that Jane Smith is the head of the neighborhood watch or head of the scout troop for the school. In addition, a person may have a different role in relation to different people. For example, Jane Smith might also be the supervisor of Joe, Steve, and Amy in an organization, but an assistant or subordinate to Michelle. In other words, people often have different roles relative to different people and organizations and it is often important to know during a communication what role the person has in that relationship.

Relationships and roles are important for knowing who is speaking, why, and in what context, This can be particularly true in a public safety environment, where the various people (hereafter "users") often assume different roles. Often times there are relationships between the users of a service or communication, and these relationships give rise to roles associated with the users within the context of the relationship.

While some roles associated with a user may be statically assigned, other roles may be dynamically assigned. In addition, at any given time, a user may be assigned or associated with more than one role. For example, a sergeant may be the "supervisor" for several subordinate officers and may simultaneously be assigned or associated as the "incident commander" for a specific incident.

During a service or communication, a second user (i.e. the recipient) typically is provided the identity or name of the first user (i.e. the caller), but not the role that the first user has relative to the second user during that communication or service. One solution to the problem has been to use a type of caller identification in which, in the context of telephony, a name can be associated with a telephone number, as described in the example above. When the second user of a telephone call has subscribed to the caller identification service, the telephone number and the associated identity/name of the first user is displayed. However, the mapping between telephone number and identity/name (hereafter "identity") is static and the same identity is provided to all second users of telephone calls.

Another solution has been to use address books. Typically cellular devices have "address books" that allow the user to associate identities (i.e., names or other text) with telephone numbers and other user/service identifiers (pager number, email address, etc.). When a user receives a service (telephone call, text message, etc.), the cellular device will typically display the corresponding identity (name or text) from a service identifier stored in the address book. However, in this case, only the second user of the service is able to control what identity is displayed. In addition, this solution does not work when the service identifier provided to the second user (such as an email address) is not included in the address book or not associated with a known identity in the address book.

Another solution has been to use "friendly" addresses in some services. When Uniform Resource Identifiers (URIs) (such as, Session Initiation Protocol (SIP) URIs) or email addresses are associated with users, often times a URI or email address will be created to be more easily read by a user. For example, rather than using xyz123@company.org a more "friendly" address is used such as officer_smith@company.org. However, these addresses typically only identify the user, are static, and do not reflect a role being fulfilled by the user.

Another solution has been to use nicknames. The Open Mobile Alliance Push to Talk over Cellular (OMA PoC) uses a nickname or "display-name" associated with a URI. However, the nickname is not only provided to all participants of a service session (which may not always be appropriate for each second user of a service), it is also used for every initiated service. While the user may be allowed to select appropriate nicknames for different services, it does not provide the ability to provide different roles to the different second users of a service.

Even with all the aforementioned solutions, a user's identity alone is not sufficient for a second user to recognize the other user or users participating in the communication, especially if the user is unknown to the second user.

BRIEF DESCRIPTION OF THE FIGURES

The accompanying figures, where like reference numerals refer to identical or functionally similar elements throughout the separate views, together with the detailed description below, are incorporated in and form part of the specification and serve to further illustrate various embodiments of concepts that include the claimed invention, and to explain various principles and advantages of those embodiments.

Figure 1:
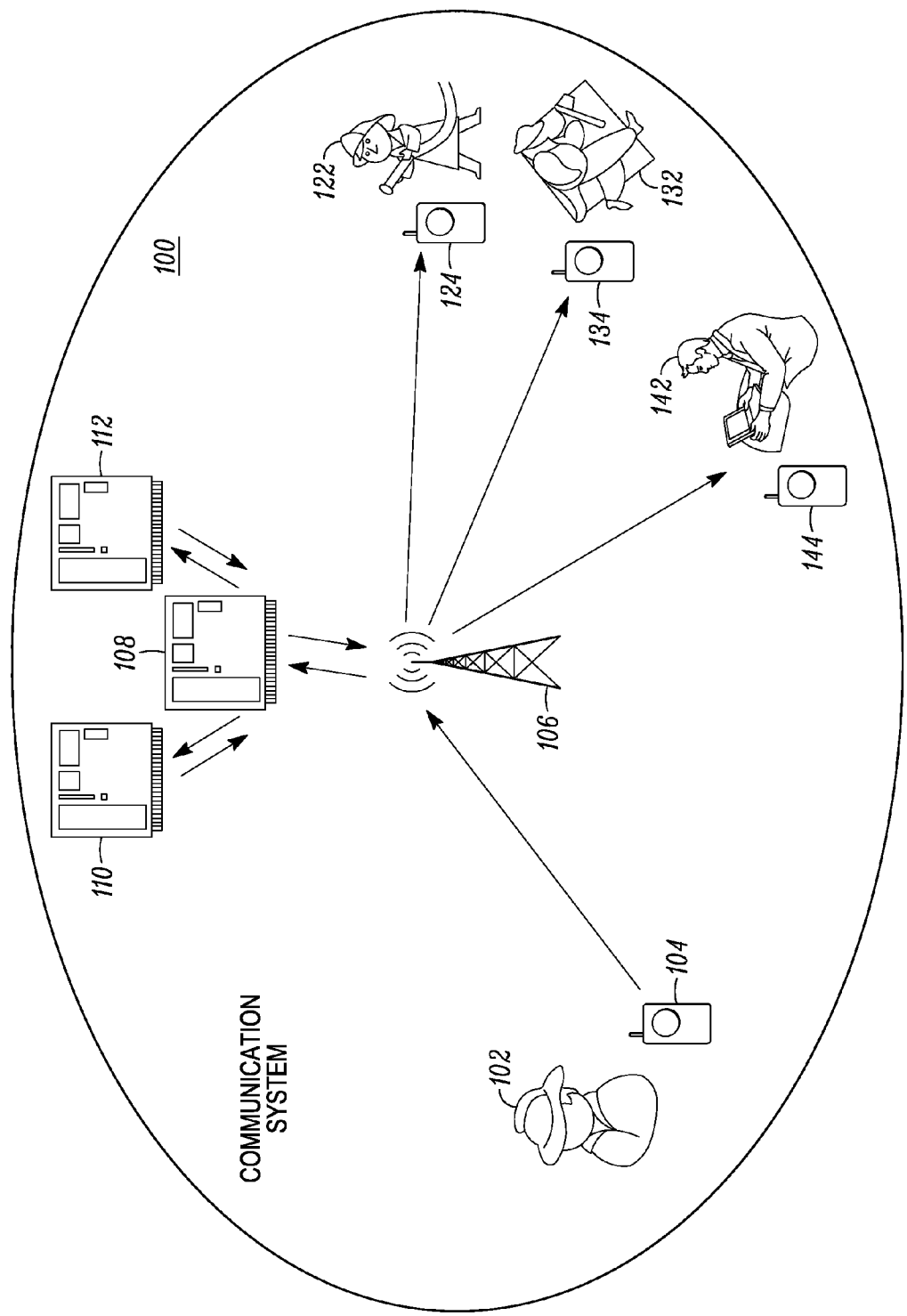
FIG. 1 is an exemplary diagram of an example of the method to convey one or more roles of users to all the communication participants in accordance with the principles of the present disclosure.

Skilled artisans will appreciate that elements in the figures are illustrated for simplicity and clarity and have not necessarily been drawn to scale. For example, the dimensions of some of the elements in the figures may be exaggerated relative to other elements to help improve understanding of various elements and embodiments of the present disclosure. In addition, the description and drawings do not necessarily require the order illustrated. It will be further appreciated that certain actions and/or steps may be described or depicted in a particular order of occurrence while those skilled in the art will understand that such specificity with respect to sequence is not actually required.

Apparatus and method components have been represented where appropriate by conventional symbols in the drawings, showing only those specific details that are pertinent to understanding the various embodiments so as not to obscure the disclosure with details that will be readily apparent to those of ordinary skill in the art having the benefit of the description herein. Thus, it will be appreciated that for simplicity and clarity of illustration, common and well- understood elements that are useful or necessary in a commercially feasible embodiment may not be depicted in order to facilitate a less obstructed view of these various embodiments.

DETAILED DESCRIPTION

The present disclosure supplements the identity of the users to a communication with the roles being statically or dynamically assigned to or associated with the users of the system. Providing one or more roles for a first user that is appropriate relative to a relationship with a second user can facilitate smoother communications. A method for identifying and conveying a role of a first user relative to a second user in a communication comprises using a communication server and determining an identity of the first user, determining an identity of the second user, determining a relationship between the first user and the second user, determining an associated role with the first user relative to the relationship between the first user and the second user, and conveying the associated role of the first user relative to the relationship to the second user. The communication server receives an indication that a communication between the first user and the second user is initiated. The communication server may also access one or more sources. The one or more sources are configured for tracking one or more of the identities, relationships, and roles of the first and second users.

A user may be both a first user and a second user simultaneously; thus, roles may be exchanged between the two users. If there is no role associated with the first user relative to the relationship between the first user and the second user, a default identity and/or role may be conveyed.

The role of the first user relative to the second user is conveyed to the second user on a communication device. The relationship between the first user and the second user is tracked in the communication server and/or source.

The identity of the first user and/or the role associated with the first user may be fixed and/or dynamically assigned. Similarly, the identity of the second user and the role associated with the second user may be fixed and/or dynamically assigned. The first and second users may have many relationships and/or many roles. The role of the first user relative to the relationship between the first user and the second user conveyed may be controlled by the first user. If more than one role is associated with the first user relative to the relationship between the first user and a second user, all or less than all of the roles may be conveyed to the second user.

An apparatus for conveying the role or roles of first users in a communication to a plurality of second users in a communication comprises a communication server which is configured for determining the identities of each of a plurality of users, determining a relationship between two or more of the plurality of users based on the identities, determining an associated role or roles for one or more of the plurality of users based on the relationship between the two or more of the plurality of users, and conveying the role or roles to each of the plurality of users. The communication server is also configured for accessing one or more sources which tracks the identities, relationships, and roles.

In the present disclosure, a "first user" simply refers to the user having his/her/its identity and/or role conveyed to one or more second users. Similarly, the term "second user" refers to the user receiving the identity and/or role of the first user. The term user may refer to either first user, second user, or both. A first user may also simultaneously be a second user while a second user may also simultaneously be a first user. It is understood that there could be more than one first user within a communication at a time. Similarly, there may be more than one second user within a communication at a time and/or for the duration of the communication.

An identity refers to the name, call sign, nickname, address, device identifier, or other form of identification of the user, either first user or second user, independent of the role or roles the user assumes or is associated or assigned.

A relationship in the present disclosure can be characterized as an association, affiliation, link, correlation, or connection between two or more users in situations such as, but not limited to, business, recreational, organizational, familial, geographical, temporal, and natural or manufactured incidents, such as being assigned to the same incident, being part of the same pubic safety agency, and/or other situations. A relationship may arise from the context of the users in the communication or may arise from a third party or organization associated with the users, but not a user in the communication. In addition, a first user may have one or more relationships with a second user.

A role or roles in the present disclosure can be static or dynamic and refer to a position, title, level, status, class, category, grade, place, rank, label, designation, description, alias, heading or other term used to describe a job, position, or state of being. A user may have no roles, one role, or multiple roles within the context of one relationship.

A communication refers to any wired or wireless transfer of information or media including, but not limited to, audio, video, data, or other media or other control information between two or more communication devices. A communication may occur over a narrowband network, a broadband network, an internet connection, intranet connection, extranet, file transfer protocol (FTP) site, and may include point-to-point communications, and the like.

A communication device includes, but is not limited to devices commonly referred to as narrowband communication devices and broadband communication devices. Examples of narrowband communication device include, but are not limited to, access terminals, mobile radios, portable radios, mobile stations, wireless communications devices, user equipment, mobile devices, or any other narrowband communication device capable of operating in a wireless environment or any wired devices such a dispatch console. Examples of digital narrowband communication systems include the Association of Public-Safety Communications Officials (APCO) Project 25 (P25) Phase I, APCO P25 Phase II, Terrestrial Trunked Radio (TETRA), integrated Digital Enhanced Network (iDEN), and Digital Mobile Radio (DMR). Examples of broadband communication devices include, but are not limited to, mobile phones, cellular phones, personal digital assistants (PDAs), laptops, desktops, Computer Aided Dispatch (CAD) terminals, radio dispatch consoles, computers, Voice over Internet Protocol (VoIP) telephones, televisions, and any other wired or wireless device capable of receiving or accessing content from a broadband system. Digital broadband communication systems include, but are not limited to, the Institute of Electrical and Electronics Engineers (IEEE) standards for wireless networking such as 802.11 and 802.16, and other wireless technologies, such as evolution data optimized (EVDO), universal mobile telecommunications service (UMTS), high speed packet access (HSPA), and long term evolution (LTE) wireless technologies.

As used herein, a communication server is a device that can receive, store, and/or process information (including either control or media, e.g. data, voice (audio), video, etc.) from a source and transmit information in signals to one or more communication devices via a communication network or link. Types of communication servers include, but are not limited to, equipment commonly referred to as servers, databases, controllers, base stations, base transceiver stations, access points, routers, client devices, computers, on an internet, intranet, FTP site, or extranet website, or other digital information repository or any other type of mobile or fixed infrastructure equipment interfacing a wired or wireless communication device in a communication system, network, or environment.

The identities, relationships, and role associations of the users may be hosted, in addition to the communication servers, in a collateral source including, but not limited to, the communication servers listed above as well as a database, server, computer, on an internet, intranet, FTP site, or extranet website or other digital information repository accessible by the communication server.

Turning now to the figures, and in particular to FIG. 1, identities and relationships among various users of a communication system are tracked, roles are associated with each relationship, and the associated roles are conveyed to each second user in a communication by a communication server. In the present disclosure, "track" and "tracking" includes, but is not limited to, receiving, storing, accessing, manipulating, and/or otherwise analyzing data/information.

In FIG. 1, a scenario is shown in which an incident, for example, a fire, has occurred and a group of users have been assigned to respond. User 102, who in this example is a first user, uses communication device 104 to begin a group communication with users/second users 122, 132, and 142 all of which comprise the group created to respond to the fire, in this example. It is understood that while in this example, the first user 102 is also the originator of the communication, the term "first" user need not refer to the originator of the media (voice, data, etc., or control information transferred to the second users or identify the user that has been granted the right to transmit media.) and is independent of the user who originated the communication.

When the first user 102 begins the group communication with the second users 122, 132, and 142 through communication system 100, the communication network 106 indicates to one or more communication servers 108 that a communication has been initiated and the identities of the first user 102 and the second users 122, 132, and 142 are determined. If no user is identified at the communication device, for example, if a user does not log into the communication device, the communication device itself has an identity which may be determined.

The communication server(s) 108 then uses the identities of the first user 102 and the second users 122, 132, and 142 and determines any relationship(s) between the first user and the second users that exist or may have been created. In the present example, the presence of an incident report at a source 110, 112, with the identities of the users therein, supplies the basis for or creates a relationship between the first user and the second users. The incident report, having the identities of the first user and the second users, is accessed from the source(s) 110, 112, and the relationships between the first user and the second users are determined by the communication server 108. In this example, the relationship is that the first user and the second users are all users involved in the incident of the fire.

Based on the relationship the users have with each other with respect to the incident, the roles associated with or assigned to the first user and the second users are determined. Communication server 108 may query one or more sources 110, 112, such as a CAD server, to acquire the roles associated with the users in the relationship. For example, source 110 may have the information that user 102 is the incident commander (and perhaps store roles for the other users, too). Communication server 108 may also query another source 110, 112 (perhaps a directory server) to learn user 102 is also the supervisor for user 142. It is understood that the communication server 108 may also be the source which is queried and accessed.

The role of the first user 102 is conveyed to the second users 122, 132, and 142 on communication devices 104, 124, 134, and 144 by the communication server 108 through the communication network 106. For example, the role of the first user relative to the relationship created within the context of the incident described above may be such that the role conveyed is user 102 is the incident commander.

Different roles may be conveyed to different second users based on the relationship and subsets of those relationships to the first user. Communication server 108, via communication network 106, conveys the role of the first user to the second users; in this example, it conveys to the second users 122, 132 that the first user 102 is the incident commander. In addition, communication server 108, via communication network 106, informs the second user 142 that the first user 102 is the incident commander and/or the supervisor. The process can be repeated (or remembered) when another user has its identity and role conveyed.

Other examples of roles can be created within the context of a relationship formed by a communication. For example, one user may be identified as the originator of the session. Another user may be identified as being the current provider of media (such as audio, video, or other media). And a third user may be identified as the one that is permitted to issue pan-tilt-zoom (PTZ) controls to a camera sourcing a video stream or the one permitted to issue digital video recorder (DVR) playback controls. In such an embodiment, a role is based on the relationship among the users involved in the communication, and the relationship may be simply the fact that all of the users are party to the communication.

In another embodiment, the first user may have been granted control of a shared resource (such as, PTZ control of a networked camera, playback control of a DVR, or wireless channel resource control for quality of service (QoS) purposes). For example, the user may have exclusive authorization to issue PTZ control information to a networked video camera in order to control the direction that the camera is facing and the depth of zoom of the camera. A second user may also be viewing the same networked video camera that the first user is controlling. In this case, the role of the first user in relation to the second user would be conveyed to the second user. Likewise, similar processing would be performed if a user is controlling the playback controls (e.g. fast forward, rewind, play, or the like) of a DVR.

Another example of the use of roles relative to a relationship is in a presence service. In a presence service, status information about a user (such as, whether the user is currently available for communication, the user's current incident assignment status, etc.) is conveyed to other interested users. In another embodiment, the role of a first user is determined relative to the relationship to a second user and the role of the first user sent as part of the presence information about the first user is conveyed to the second user.

Figure 2:
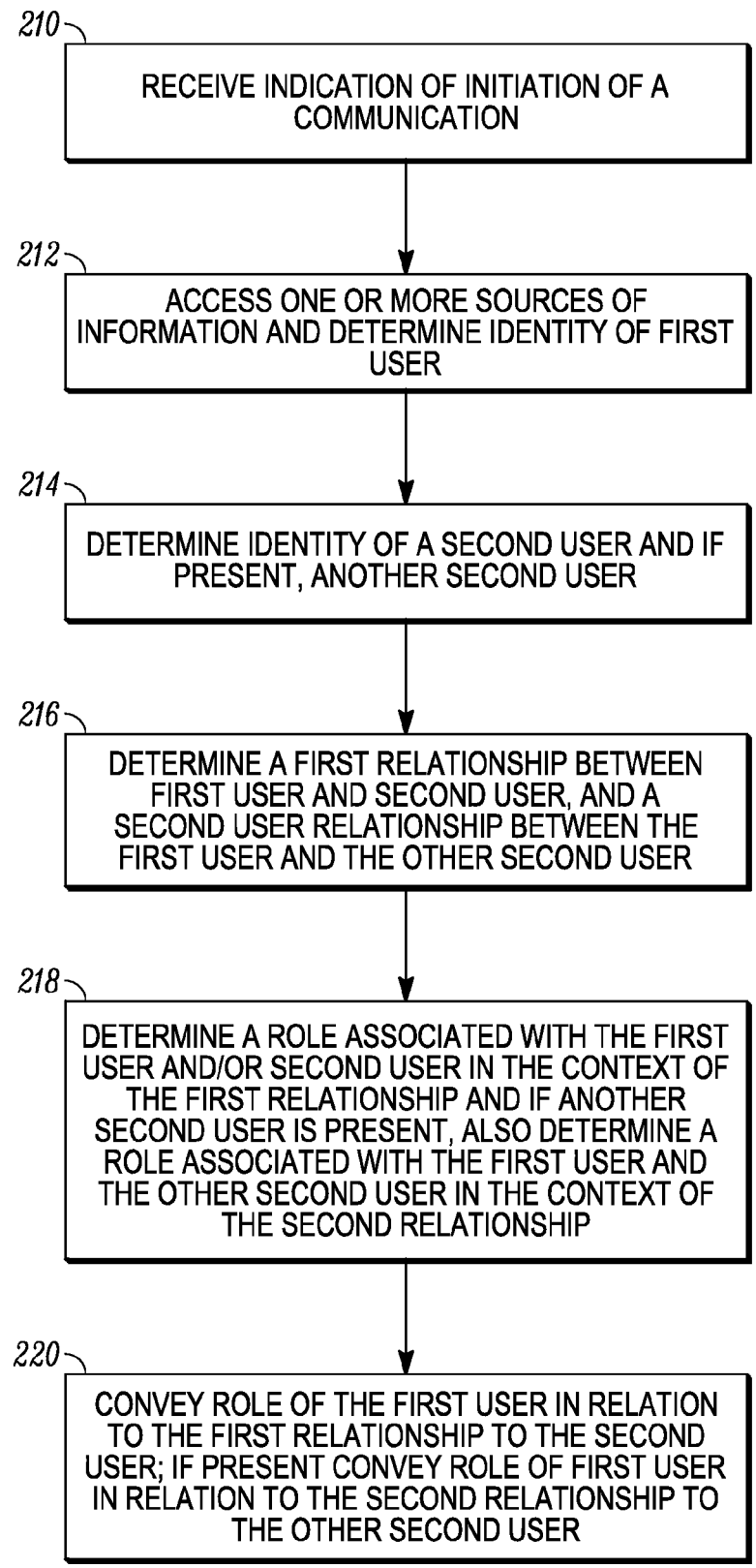
FIG. 2 is a flow diagram of an embodiment of the present disclosure.

In conjunction with FIG. 1, FIG. 2 is a flowchart of an exemplary embodiment of the present disclosure. A communication server receives an indication that a communication has been initiated between two or more users at step 210. The identity of the first user is determined at step 212. Similarly, the identities of the second users are determined at step 214. It is understood that there may be more than one second user in the communication, and for ease of understanding, two second users (second user A and second user B) are described in the present example. When a communication is initiated, the identity of the first user is typically conveyed in a message sent to the communication server. The identity of the second users to a communication may be conveyed in the same message as the identity of the first user or can be determined by the communication server.

After the identities of the first user and the second users are determined, the communication server(s) accesses various sources to determine a first relationship between the first user and the second user A, and a second relationship between the first user and the second user B, at step 216. While there may be multiple relationships between the users, only one relationship between each set of users is shown in the present example for ease in understanding. The relationship between the first user and the second user A can be tracked in one or more sources 110, 112, as shown in FIG. 1. Similarly, the second relationship between the first user and the second user B is tracked, stored, accessed and/or analyzed in one or more sources at step 216. As discussed in the example above, one or more relationships may be determined between the first user and each of the second users. The relationship(s) and role(s) may be different for each second user. In other words, it is understood that multiple identities, relationships, and roles may be tracked simultaneously and that a first relationship in a group communication may be different from or the same as a second relationship in the same group communication. It is also understood that the communication server and the source may be the same device. In one embodiment, all the functions performed by the communication server and the source may be performed by the communication server.

Several means exist for determining and/or tracking the relationships among the users and the corresponding roles. For example, a communication group may be created for push-to-talk services. When the communication group is created, all the users of the group are identified and this information is stored in a dynamic communication server. Being users of the same communication group creates a relationship among the users that may be tracked. In addition, there may be more than one relationship between the same two users. For example, the relationship between the first user and the second users in the example of FIG. 1 may be in the context of a specific incident, such as a fire, but also may be in the context of a work group, wherein the first user and the second users are all members of a group or organization in addition to being participants in a specific incident.

Another way to track relationships and corresponding roles among users may be to use information that is already captured by a CAD system. For example, when an incident is created, various personnel are assigned to the incident and some of those assigned may be assigned specific roles. While smaller incidents may only have one or two users associated with roles, larger incidents or pre-planned events are likely to have many more users being assigned roles. For example, the users may be assigned to the various roles defined by the National Incident Management System Incident Command System (NIMS ICS).

Relationships may also be based on more static information, such as that which would be stored in a source, such as a company directory providing an organization hierarchy. In this case, for example, it would be possible to determine the supervisor of any given user.

Another possibility to track relationships and corresponding roles among users may be to use a previously completed service to identify a role associated with another user. For example, a new user that is not assigned to an incident may have initiated a communication with the "incident commander" of the incident. This may be remembered so that later when the incident commander initiates the same or a different service with the new user, this relationship and corresponding role may be used. It is also contemplated that other sources of information, such as that related to presence and location, may be used to identify relationships between users.

The communication server(s) uses the discovered relationships to determine if there are any roles for the first user relative to the second user A and to determine if there are any roles for the first user relative to the second user B, at step 218. The communication server may access multiple sources to determine the roles associated with the relationships or, in one embodiment, these roles and relationships may be tracked and stored at a single source or at the communication server. A single source or communication server would also more easily facilitate prioritizing the roles when more than one role is identified. For example, a first user of a communication may be both an incident commander as well as a supervisor, but for the communication being originated, it may be more important to identify the first user as the incident commander rather than the supervisor. Thus, the priority of the roles may be tracked more easily in a single communication server or source.

An example of one mechanism for determining which role to provide is to use the CAD status. The CAD can track the status of each user. As suggested above, it can determine which user has been assigned which role in an incident. For example, the CAD can determine that a user is assigned as the incident commander for a particular incident. For example, when a communication group is created to handle an incident, such as a fire, a relationship among all the group members is established.

In another embodiment, when the relationship (in this example, an incident-based communication group) is created, or as it is modified, a user's identity may be associated with or assigned a role. In other words, in one embodiment, the role may replace the identity that would initially have been provided to the communication server. Thus, in this example, rather than querying the source, such as the CAD server, to learn which user has been assigned the role of incident commander, one member of the group may be identified as the "incident commander".

In another embodiment, users may be assigned different roles or no role at all at any given point in time during a communication. As such, the assigning of roles to first users and second users may be dynamic. For example, when a higher-ranking officer is assigned to the incident and the communication group, the role of "incident commander" may be reassigned to this officer and the role associated with the user originally identified as the incident commander may be replaced with "assistant incident commander".

Once one or more roles have been identified, the first user's associated roles, based on the relationships between the first user and each second user, is then conveyed to the second users, at step 220. The role of the first user based on the first relationship is conveyed to the second user A, and the role based on the second relationship is conveyed to the second user B. On the other hand, if no role has been assigned, a default role and/or identity may be conveyed, such as a default role and/or identity of the subscriber unit.

The associated role of the first user may be conveyed to the second user in many ways, depending on the service used. For example, in a SIP environment, the SIP URI of the first user may be replaced with a different SIP URI that identifies the role of the first user. For example, Officer_Smith@police.org may be replaced with Incident-2682-Commander@police.org.

In another embodiment, the role may simply be provided as supplementary information. For example, the "display-name" associated with the SIP URI of the first user may be used to convey the role. For example, using "Incident-2682-Commander" <Officer_Smith@police.org> may identify Officer Smith as the incident commander.

In another embodiment, additional headers may be added to the SIP messaging to convey the role of the first user to the second user. This approach may be useful when more than one role has been identified and it is desirable to provide the second user with more than one role associated with the first user. This may also be performed in conjunction with one of the previous methods when used to convey the "primary" role of the first user to the second user. Similar things may also be done when identifying the sources of media when a user is a participant in a communication.

In yet another embodiment, the roles may also be conveyed in the floor control signaling. For example, when arbitration is used to determine which participant in a communication is permitted to speak (or transmit other media), additional signaling is used to inform the other participant which participant has been selected. Within this messaging, it is equally important to not only convey the identity of this first user, but also a role or roles with respect to a relationship with a second user participating in the communication.

Another embodiment would be to also convey the roles of the first user to a second user by embedding this information in the communication itself. For example, the role may be embedded within the media or communication signal being transferred. In one specific example, in the payload of a real-time transport protocol (RTP) packet, not only would media be provided, but also any roles associated with the source of the media would be identified. Similarly, in a message sent by an arbiter to the users of a half-duplex communication which identifies the first user who is permitted to provide the media to the second users (e.g. by using a Media Burst Floor Taken message as defined by OMA PoC) may be modified to also include any appropriate roles associated with first user.

In another embodiment, the first user of a service or the source of media controls the roles that will be seen by the second user. For example, a first user may want to have a "personal" communication with a second user. In this case, the first user may have the option to indicate that a system-determined role should not be used or the first user may be able to provide the specific role(s) to be shown to the second user. It is also contemplated that the first user of a service may query the communication server to identify the roles which will be used for a specific service. The first user can then also have the ability to choose which of the roles should be used when the actual service is initiated.

Figure 3:
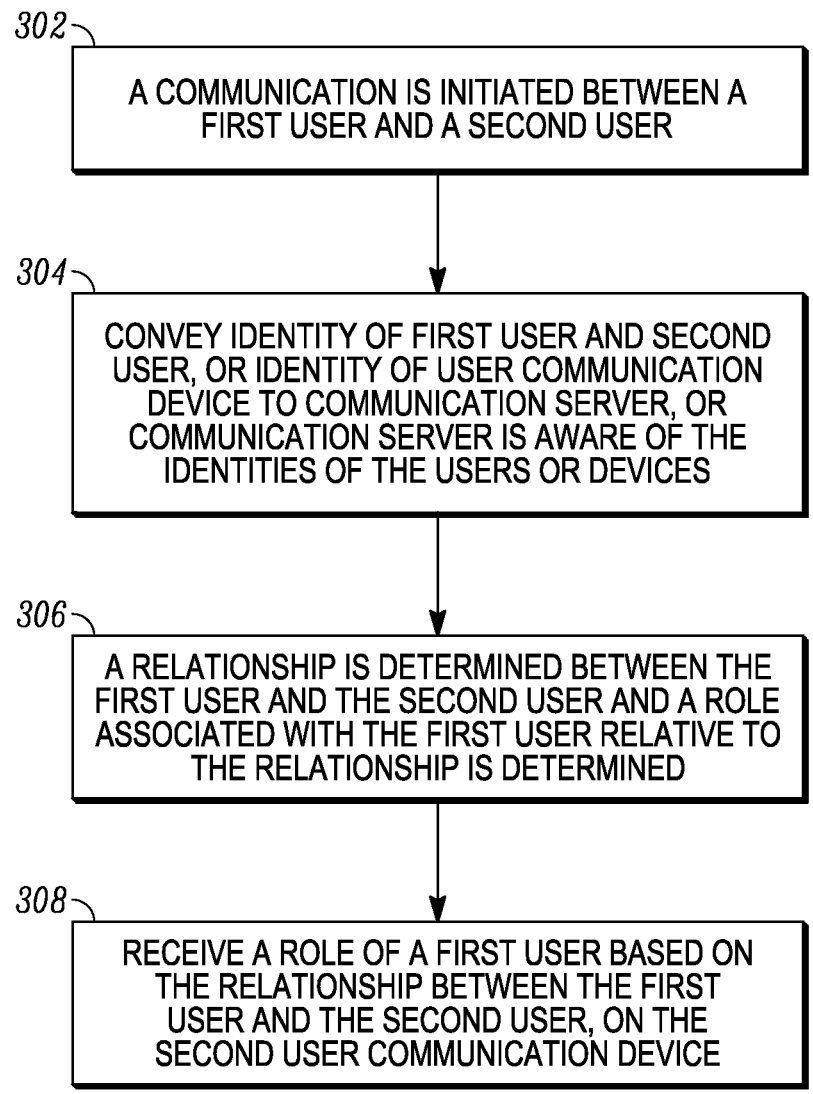
FIG. 3 is a flow diagram of another embodiment of the present disclosure.

FIG. 3 shows another embodiment of the present disclosure. A communication is initiated between a first user and a second user, at step 302. The first and second users convey their respective identities to the communication server, or the communication server becomes aware of the identities of the users, at step 304. The identity may be the identity of the user or the identity of the communication device. The communication server, as discussed above, uses the identities to determine a relationship between the first and second users, at step 306. Using the relationship, a role for the first user is determined relative to the relationship, at step 306. The second user receives the role of the first user in relation to the relationship between the first user and the second user on the second user's communication device, at step 308. As discussed above, the means by which the role is conveyed depends on the type of communication occurring.

The benefits of the present disclosure are many. The present disclosure provides the second user of a service or media with additional information needed to determine the identity and relationship of a first user relative to the second user. With devices being provided with larger displays, providing this supplemental information is more feasible. This can be particularly useful when the source of the communication is not known by the second user and not included in a local address book. For example, in a large incident, a second user may not know the commanding officer, and receiving a communication from an unknown user may be confusing or the user may not give it the attention it deserves. But if the first user can be identified as the commanding officer, the second user is less likely to be confused. Moreover, as the roles associated with the users are changed, these changes are reflected in each service initiated to always provide the most accurate and appropriate information. In general, supplementing current communications with additional information is likely to facilitate smoother communications and help avoid potential confusion.

In the foregoing specification, specific embodiments have been described. However, one of ordinary skill in the art will appreciate that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms, such as first and second, top and bottom, and the like, may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed. Also, the sequence of steps in a flow diagram or elements in the claims, even when preceded by a letter does not imply or require that sequence.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and apparatus for indicating status of channels assigned to a talkgroup described herein. The non-processor circuits may include, but are not limited to, a radio receiver, a radio transmitter, signal drivers, clock circuits, power source circuits, and user input devices. As such, these functions may be interpreted as steps of a method to perform the indicating of status of channels assigned to a talkgroup described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Both the state machine and ASIC are considered herein as a "processing device" for purposes of the foregoing discussion and claim language.

Moreover, an embodiment can be implemented as a computer-readable storage element or medium having computer readable code stored thereon for programming a computer (e.g. comprising a processing device) to perform a method as described and claimed herein. Examples of such computer-readable storage elements include, but are not limited to, a hard disk, a CD-ROM, an optical storage device, a magnetic storage device, a read only memory (ROM), a programmable read only memory (PROM), an erasable programmable read only memory (EPROM), an electrically erasable programmable read only memory (EEPROM) and a flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for identifying and conveying a role of a first user relative to a second user in a communication, the method comprising at a communication server:
   receiving an indication at a server that a communications has been originated from the first user to the second user through a communication system;
   determining by the server, an identity of the first user that is originating the communication to the second user through the communication system;
   determining an identity of the second user that is receiving the communications from the first user;
   determining, by the server, a relationship created between the first user and the second user;
   determining, by the server an associated role of the first user relative to the relationship between the first user and the second user; and
   conveying the associated role to the second user through the communication system as part of the communications from the first user to the second user, wherein conveying the associated role to the second user comprises conveying the associated role by one or more of replacing an identifier of the first user in a messaging between the first user and the second user, adding additional headers to a messaging between the first user and the second user, conveying the associated role in a floor control signaling embedding information regarding the associated role in a media or communication signal exchanged between the first user and the second user, and including the associated role in a payload of a packet sent to the second user.

2. The method of claim 1 further comprising tracking the identity of the first and second user.

3. The method of claim 2 further comprising tracking the relationship created between the identity of the first user and the identity of the second user.

4. The method of claim 1 wherein the second user is also a different first user.

5. The method of claim 4 wherein the first user is also a different second user.

6. The method of claim 1 further comprising accessing at least one external source, the at least one external source configured for tracking at least one of the identity, the relationship created between, and the role of the first and second users.

7. The method of claim 1 wherein the role conveyed is a default role.

8. The method of claim 1 wherein at least one of the identity of the first user and the role associated with the first user is statically assigned.

9. The method of claim 1 wherein at least one of the identity of the first user and the role associated with the first user is dynamically assigned.

10. The method of claim 1 wherein at least one of the identity of the second user and the role associated with the second user is statically assigned.

11. The method of claim 1 wherein at least one of the identity of the second user and the role associated with the second user is dynamically assigned.

12. The method of claim 1 wherein the role of the first user relative to the relationship created between the first user and the second user is conveyed over a communication network.

13. The method of claim 1 wherein the role of the first user relative to the relationship created between the first user and the second user conveyed is controlled by the first user.

14. The method of claim 1 wherein a plurality of roles are associated with the first user relative to the relationship created between the first user and the second user, and less than all of the plurality of roles is conveyed to the second user.

15. The method of claim 14 further comprising:
tracking a priority of the plurality of roles; and
conveying, based on the tracked priority, one role from the plurality of roles of the first user relative to the relationship created between the first user and the second user to the second user.

16. The method of claim 1 wherein there are a plurality of relationships between the first user and the second user.

17. The method of claim 1 wherein there are a plurality of second users and a different relationship between the first user and each of the plurality of second users, wherein the first user is associated with a different role in each of the different relationships.

18. The method of claim 1 further comprising:
re-assigning the associated role of the first user based on a relationship between a third party and either the first user or the second user; and
conveying the re-assigned associated role of the first user relative to the relationship created between the first user and the second user to the second user.

19. An apparatus for conveying at least one role to a plurality of users in a communication, the apparatus comprising:
a communication server, receiving an indication at a server that a communications has been originated from a first user to the plurality of users through a communication system, the communication server configured for determining at least one identity of each of a plurality of users receiving the communications from the first user, determining a relationship created between the plurality of users and the first user based on the identities of the plurality of users, determining at least one role for the plurality of users based on the relationship created between the plurality of users and the first user, and conveying the at least one role to each of the plurality of users through the communication system as part of the communications from the first user to the plurality of users, wherein the communication server configured to convey the at least one role to the second user by conveying the at least one role by one or more of replacing an identifier of the first user in a messaging between the first user and the second user, adding additional headers to a messaging between the first user and the second user, conveying the at least one role in a floor control signaling, embedding information regarding the at least one role in a media or communication signal exchanged between the first user and the second user, and including the at least one role in a payload of a packet sent to the second user.

20. The apparatus of claim 19 wherein the communication server is configured for accessing at least one external source in order to determine the at least one role.

* * * * *